June 21, 1966 J. W. SPRAGUE 3,257,169
METHOD FOR THE PRODUCTION OF CYANAMIDE
Filed Feb. 16, 1962
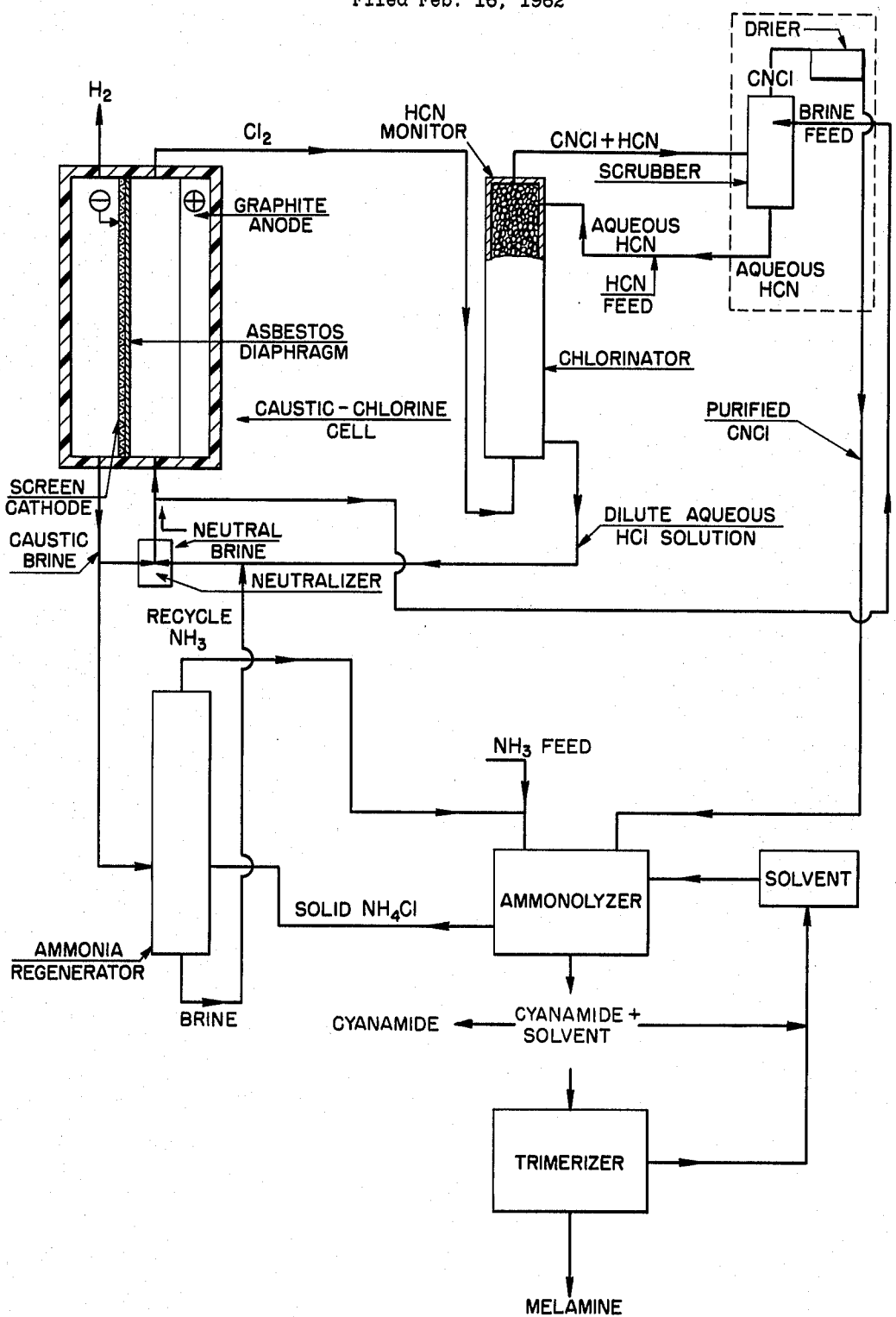

() # United States Patent Office 3,257,169
Patented June 21, 1966

3,257,169
METHOD FOR THE PRODUCTION OF CYANAMIDE
James W. Sprague, Streetsboro, Ohio, assignor to The Standard Oil Company, Cleveland, Ohio, a corporation of Ohio
Filed Feb. 16, 1962, Ser. No. 173,684
5 Claims. (Cl. 23—190)

This invention relates to a cyclic process for the preparation of cyanamide from ammonia and hydrogen cyanide, adapted for the commercial production of melamine and/or guanamine on a continuous basis, and to an apparatus for performing the said process.

In U.S. Patent No. 3,105,023 dated September 24, 1963, there is described the electrochemical reaction of hydrogen cyanide and an ammonium halide to produce cyanogen halide. Cyanogen halide, dissolved in an inert solvent, can be reacted with ammonia to produce cyanamide in accordance with the procedure of Patent No. 3,181,932 dated May 4, 1965. The two reactions involved, using ammonium chloride, can be written as follows:

(1) $HCN + NH_4Cl \xrightarrow[\text{compartmented cell}]{\text{electrolysis in}} ClCN + NH_3\uparrow + H_2\uparrow$ (2) $ClCN + 2NH_3 \xrightarrow[\text{solvent}]{\text{inert}} CNNH_2 + NH_4Cl\downarrow$ The foregoing two reactions, which can be performed in sequence to yield a continuous process, produce excellent yields of cyanamide. However, a specially constructed electrolysis cell is required for step 1 to prepare the cyanogen chloride.

The present invention avoids such specially constructed cells, by preparing the cyanogen chloride in two separate but interrelated steps, and then reacting cyanogen chloride with ammonia. The chemical reactions involved in the method of this invention are as follows:

(1) 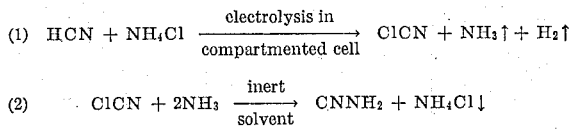

(2) $Cl_2 + HCN \xrightarrow{\text{chlorinating column}} ClCN\uparrow + HCl$ (3) $ClCN + 2NH_3 \xrightarrow{\text{inert solvent}} CNNH_2 + NH_4Cl$ The two recycle reactions to utilize by products are:

(4) 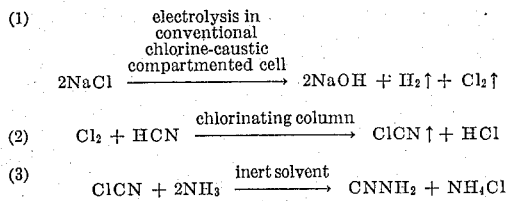

(5) 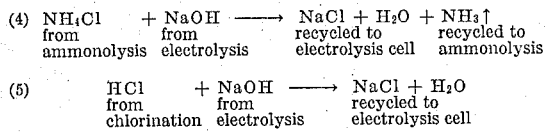

The overall reaction of this invention therefore is

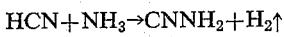

$HCN + NH_3 \rightarrow CNNH_2 + H_2\uparrow$

In the method of the present invention, aqueous alkali metal chloride is electrolyzed in a caustic-chlorine cell to form hydrogen gas, chlorine gas and alkali metal hydroxide. The aqueous alkali metal chloride preferably employed in this invention is commercial brine, an aqueous saturated solution of sodium chloride. However, any brine containing from about 5 to about 26% by weight of sodium chloride can be used. Since the alkali metal chloride is not consumed in the reaction, aqueous solutions of other more expensive alkali metal chloride salts, such as lithium chloride and potassium chloride, can, if desired, be employed.

The chlorine gas from the electrolysis cell is reacted with hydrogen cyanide to form cyanogen chloride. The cyanogen chloride, which can, if desired, be purified to remove any residual hydrogen cyanide, is next reacted with ammonia in the presence of a solvent to form cyanamide, after which, if desired, the solvent can be removed and recycled. If melamine is the desired product, the trimerization of cyanamide can be carried out in the same solvent as the ammonolysis, and the solvent recovered and recycled after the trimerization.

The byproduct ammonium chloride from the ammonolysis reaction is separated from the cyanamide, and reacted with alkali metal hydroxide solution from the electrolysis cell, to remove ammonia, which is recycled to the ammonolyzer, and brine, which is recycled to the electrolysis cell. Dilute byproduct hydrogen chloride brine solution from the chlorination is reacted with alkali metal hydroxide from the electrolysis cell to yield an alkali metal chloride brine solution, which is returned to the electrolysis cell. Thus, all byproducts are utilized by recycling in the process of the invention.

The figure is a schematic diagram of the apparatus of this invention illustrating application of the method, and can be referred to for a more complete understanding thereof.

The caustic-chlorine cell employed in this invention advantageously is of the type commercially available. In such cells, chlorine is conventionally produced at the anode, and hydrogen and an alkali metal hydroxide, such as sodium, potassium or lithium hydroxide, are produced at the cathode. The nature of the anode and cathode materials is not critical. Graphite is usually used as the anode, and iron as the cathode. Compartments are separated by means of a diaphragm of inert ion-permeable material, usually made of asbestos. Aqueous alkali metal chloride solution flows from the anode compartment through the diaphragm into the cathode compartment. Back-diffusion and migration of ions to the anode are minimized by controlling the flow rate so that only part of the alkali metal chloride solution is electrolyzed.

The construction and method of operation of such cells is conventional. Additional details thereon may be found in "Encyclopedia of Chemical Technology," by Kirk et al., volume 1, pages 361–370 (Interscience, 1947), articles by Murray in Trans. A. I. Ch. E., 36 445–62 (1940) and Trans. Electrochem. Soc. 86, 83–106 (1944); and U.S. Patent Nos. 1,365,875 to Ward and 2,282,058 to Hunter et al. Typical commercial cells are those commonly referred to by the following names: Allen-Moore "KLM" Cell, Billiter Cell, Dow Cell, Diamond Alkali Cell, Gibbs Cell, Hargreaves-Bird Cell, Hooker Type-S Cell, Krebs Diaphragm Cell, Nelson Cell, Townsend White Cell, Tucker-Wendecker Cell, Vorce Cell and Wheeler Cell. The most common of these cells and the one that is preferred in this process is the Hooker Cell.

Mercury-intermediate electrode cells are also applicable for use in this invention. Typical of the commercial varieties of these cells which are also described in the aforesaid "Encyclopedia of Chemical Technology" are: Castner Cell, Castner-Mathieson Cell, I.C.I. Cell, I. G. Farben Trough-Type Cell, I.G. Farben Rotary Cathode Cell, Krebs Mercury Cell, Mathieson Trough-Type Cell and Sorenson Cell.

The apparatus of the figure comprises a caustic-chlorine cell, equipped with screen cathode, graphite anode, and an asbestos diaphragm separating the anolyte and catholyte compartments, a chlorinator for reaction of hydrogen cyanide with chlorine from the cell, a monitor and scrubber for separation of unreacted chlorine and hydrogen cyanide from the cyanogen chloride effluent, a neutralizer for reacting the aqueous hydrogen chloride from the chlorinator with caustic to produce brine for recycling to the cell, an ammonolyzer and, optionally, a trimerizer, for conversion of cyanogen chloride to cyanamide and melamine, respectively, and an ammonia regenerator for recovery of ammonia from ammonium chloride from the ammonolyzer by reaction with caustic brine from the cell.

In operation aqueous alkali metal chloride, generally in the form of saturated brine, is supplied to the cell where a current is applied, causing the formation of chlorine at the anode and hydrogen and alkali metal hydroxide at the cathode. The hydrogen is collected by conventional means and used for whatever applications may be available, or vented to the atmosphere. The alkali metal hydroxide-alkali metal chloride mixture in the cathode compartment is divided into two parts. One part is pumped to the ammonia regenerator or recovery tower for reaction with ammonium chloride produced in the ammonolysis recation, to recover ammonia therefrom, and the other part is reacted with hydrochloric acid produced in the chlorinator, and to reduce the pH of the brine. The chlorine from the cell is fed to the chlorinator.

In the chlorination of hydrogen cyanide, any conventional chlorinator can be used. A packaged column as shown in the figure preferably is employed. Any packing materials inert to hydrogen cyanide, chlorine and hydrochloric acid can be employed, including Raschig rings and Berl saddles made from various inert materials. In the practice of this invention, for best results, chlorine and hydrogen cyanide are passed through the column counter-currently. The hydrogen cyanide is preferably added at the top of the column in the form of a dilute aqueous solution, chlorine is added at the bottom, and by-product aqueous hydrochloric acid solution is withdrawn from the bottom. The upper portion of the column should be maintained at a sufficiently low temperature to prevent liberation of free hydrogen cyanide.

Details on the reaction between hydrogen cyanide and chlorine gas can be found in U.S. Patent No. 1,588,731 to Heuser, the disclosure of which is incorporated herein by reference. As indicated in the aforesaid patent, this reaction is exothemic. Furthermore, cyanogen chloride readily polymerizes to cyanuric chloride in the presence of strong hydrochloric acid, and also begins to decompose at temperatures in excess of 60° C. Polymerization can be minimized by employing hydrogen cyanide solutions containing less than 15% by weight of hydrogen cyanide. To avoid heat decomposition, the reaction temperature should be maintained below 60° C., preferably, below 55° C. For this purpose, suitable cooling means can be provided. The temperature of the reaction also can be controlled by feeding an appropriate amount of cold brine to the column with the hydrocyanic acid solution, correspondingly increasing the concentration of the latter to compensate for the dilution with brine.

When a separate stream of brine is added to the column, it is generally added at or near the top, the chlorine gas at the bottom, and the hydrocyanic acid at some intermediate point. This procedure has the effect of maintaining low temperatures in the upper regions of the column where cyanogen chloride is produced, and relatively high temperatures at the bottom of the column, so as to cause volatilization of any unconverted hydrogen cyanide, preventing contamination of the exiting hydrochloric acid.

The cyanogen chloride streams exiting at the top of the chlorinator may be contaminated with minor amounts of unreacted chlorine, hydrogen cyanide and water. Free chlorine in this stream is undesirable, because it can react with ammonia in the ammonolysis step to form explosive nitrogen trichloride. To eliminate such chlorine, a hydrogen cyanide monitor can be incorporated near the top of the chlorination column. This monitor serves to insure the presence of a slight excess of hydrogen cyanide, which can react with any chlorine gas that may be present in the cyanogen chloride vapor.

If it is desired to remove the hydrogen cyanide from the cyanogen chloride, the cyanogen chloride exiting from the chlorinator is passed through a second packed tower, where it is washed with brine. The temperature of the washing tower should be maintained below 60° C. Generally, brine is added near the top of the tower, and the cyanogen chloride vapor at some intermediate position. Wet purified cyanogen chloride gas exits at the top of the washing tower. The aqueous hydrocyanic acid from the bottom of the tower is recycled to the chlorinator. The wet cyanogen chloride vapor is then dried by passage over a non-alkaline desiccating agent such as calcium chloride, as for example, by passing the vapor through a column containing such a desiccating agent. The dried cyanogen chloride is thereupon passed to the ammonolyzer.

The hydrochloric acid brine solution exiting from the chlorinator is pumped to a neutralizer where it is reacted with a portion of the alkali hydroxide from the electrolysis step to yield reconstituted neutral brine, which is then recycled to the electrolysis recation.

The cyanogen chloride thus obtained can be used to prepare cyanamide, and the latter to prepare melamine. Both reactions can be carried out in the same solvent. In the ammonolysis to cyanamide, the cyanogen chloride is dissolved in a suitable solvent, and then ammonia in gaseous or liquid form is added to the cyanogen chloride solution. As the reaction proceeds, ammonium chloride is produced and precipitates. Sufficient means are provided for adequate heat removal from the reaction zone and for control of ammonia addition to keep the exothermic reactions within the desirable limits of reaction rate, and prevent production of an inferior product. At the conclusion of the reaction, the solid ammonium chloride is separated from the cyanamide solution by filtration, centrifugation, decantation or other solid separation technique, and the cyanamide solution is then ready for the next step. If cyanamide is the desired product, the reaction solution can be concentrated, keeping solution temperature below about 100° C. and then cooled to precipitate cyanamide in excellent yield.

The ammonium chloride removed from the cyanamide solution is passed to a recovery unit, where it is reacted with the effluent alkali metal hydroxide solution from the electrolysis cell to liberate ammonia and produce sodium chloride. Anhydrous ammonia is recovered in a two step process in this reaction, as described in more detail in U.S. Patent No. 2,519,451. The recovery unit is operated so that water exits from the bottom of the first column and anhydrous ammonia from the top of the second column.

In the ammonolysis reaction, good yields of cyanamide are obtainable if the solvent has a good solubility for cyanamide but low solubility for ammonium chloride. Ammonium chloride in solution must be held to a minimum, to prevent side reactions involving ammonium chloride. The solvents which can be used in the ammonolysis are capable of dissolving at least 50 grams, and preferably 100 grams or more, of cyanamide per liter, and not in excess of about 5 grams, and preferably less than 1 gram, of ammonium chloride per liter, and preferably have a boiling point between about 50 and 250° C. Ammonia must also, of course, be soluble in the solvent at the ammonlysis temperatures. The solvent must also be inert under the reaction conditions. It should not, for example, react with ammonia or with cyanogen chloride. In the case where the reaction of cyanogen halide and ammonia is an intermediate step in the production of melamine, and the ammonium halide that is produced is recycled to the first reaction with hydrogen cyanide, certain special requirements have to be met by the solvent, in order that the process will be practicable commercially. The ammonium halide that separates from the solvent should be in the form of crystals that are easily handled not only in recovering them from the cyanamide solution, but also for reuse in the reaction with hydrogen cyanide. The solvent should have a sufficiently low boiling point to be easily separated from ammonium chloride crystals. Solvents meeting these requirements are capable of giving yields of cyanamide in excess of 85%. The recovery of ammonium chloride is essentially quantitative.

If the cyanamide is to be recovered, the solvent should also have a boiling point sufficiently removed from the boiling point of cyanamide to permit separation by distillation. If, on the other hand, the cyanamide solution is to be used directly to form melamine the solvent should also have a low solubility for melamine, and it should be inert under the more drastic trimerization reaction conditions.

Solvents meeting these requirements are selected from the group consisting of cyclic ethers; polyoxyalkylene ethers; sulfones, and especially the sulfolanes, five-membered ring compounds containing the group

in the ring, and having four to twelve carbon atoms, esters of aliphatic fatty acids and aliphatic alcohols having from three to about ten carbon atoms; and aliphatic nitriles having from two to about ten carbon atoms.

There is no criticality in molecular weight, except that the solvent should, of course, be a liquid preferably at room temperature and certainly at reaction temperature, and should have a sufficiently low boiling point to permit its separation from the product at the conclusion of the process.

Polyoxyalkylene and cycloalkylene ethers best meet the above requirements, and of these, tetrahydrofuran, dimethoxyethane (dimethyl ethylene glycol) and 1,4-dioxane are preferred. Dimethyl-triethylene glycol, dibutoxy diethylene glycol, dimethyl diethylene glycol, dibutyl triethylene glycol, dimethyl tetraethylene glycol and diethyl diethylene glycol are additional exemplary polyoxyalkylene ethers. The polyoxyalkylene ethers have at least two ether linked by an alkylene group and terminal alkyl groups are attached to the first and last ether groups in the chain. The ether should not have an appreciable hydrocarbon character, and it is therefore important that there be a large proportion of ether groups to carbon atoms, preferably at least one ether oxygen for each five carbon atoms.

The cycloalkylene ethers are ring compounds having the ether oxygen in the ring, which is composed of oxygen and carbon atoms. The ring will contain at least one ether oxygen for each five carbon atoms. 1,3-dioxane, and tetrahydropyran are additional examples of cyclic ethers.

The sulfolanes are ring compounds having the general structure:

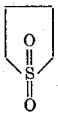

The first member of the series is sulfolane, thiophan sulfone. Additional examples are dimethyl sulfolane, methyl sulfolane, and dibutyl sulfolane.

The organic esters of fatty acids and aliphatic alcohols include ethyl acetate, ethyl butyrate, isopropyl butyrate, ethyl caproate, methyl 2-ethyl hexoate, isobutyl butyrate, ethyl propionate, isopropyl valerate and 2-ethyl hexyl acetate.

Acetonitrile, propionitrile, isobutyronitrile, and butyronitrile are exemplary nitriles.

It is important that the ammonolysis reaction mixture contain a slight excess of ammonia, in order to obtain complete reaction of the cyanogen halide. Hence, the ammonia-to-cyanogen halide ratio should be at least 2. Ratios in excess of about 2.25 can be used, provided the ammonia is removed before ammonium halide is separated, since otherwise it leads to undesirable large amouts of residual halide in the solution. The preferred range of ratios is from about 2 to 2.25.

The reaction is exothermic. The amount of heat to be removed is rather large, approximately 56 Kcal, per mol. Therefore, it may be desirable to cool the reactants to a very low temperature initially; the reaction will start at temperatures as low as −40° C. The optimum yields are obtained at reaction temperatures of from 0° C. to about 10° C., but temperatures as high as 80° C. to 100° C. can be used advantageously under pressure to maintain the reactants in the liquid phase. Because the reaction is exothermic, it is rather rapid, and may be completed in from 15 minutes to a few hours' time. The reaction proceeds very rapidly at room temperature, and is complete in about 30 minutes.

The lower the reaction temperature, the more compact the deposit of ammonium chloride crystals that is obtained, and this type of deposit is advantageous because of easy filtration. At temperatures above or near the boiling point of the cyanogen chloride, about 13.8° C., a large amount of the chloride will appear in the vapor phase above the reaction mixture, and this may be undesirable because of the loss thereof in undesired side reactions. This problem can be avoided by keeping the reactor full, i.e., a minimum of freeboard above the reaction mixture. If cyanamide is the desired end product, the reaction temperature should not be permitted to exceed 100° C. because of the possibility of other or side reactions.

The concentration of the reactants in the reaction solution can be widely varied. Good yields of cyanamide are obtainable at concentrations of cyanogen chloride as low as about 0.01%. The maximum concentration is imposed by the need for good contacting efficiency between the ammonia and the reaction mixture. At about about 35% weight by volume cyanogen chloride the reaction mixture becomes too viscous or pasty due to suspended ammonium chloride to permit good control of the reaction. The cyanogen chloride concentration has a relatively small effect upon the yield of ammonium chloride or cyanamide, but the purity of the product is improved by use of dilute solutions containing from 6 to 18% cyanogen chloride.

The solvent employed should be substantially anhydrous, for optimum yields. Ammonium chloride is extremely soluble in water, and the presence of water can therefore lead to losses of this product, thus increasing the cost of operation. However, the reaction will proceed in the presence of water, and rather large amounts can frequently be tolerated, up to about 10% by weight of the solution.

It is usually preferable in carrying out the reaction to dissolve the cyanogen chloride in the solvent, and then admit ammonia gas or liquid ammonia at a rate sufficient to permit control of the reaction temperature within the desired range. The reaction system should be provided with a means for carrying off the heat liberated, such as refluxing beneath a condenser, or by cooling coils inserted within the reaction vessel, or by a cooling jacket enclosing the reaction vessel. The refluxing temperature can be lowered if the solvent has a higher boiling point than the desired reaction temperature, by including a small amount of a compatible inert lower boiling liquid, such as isopentane, pentane and dimethyl ether. As the reaction proceeds, ammonium chloride will separate out, and it will be desirable to agitate the system to maintain uniformity. After reaction is completed, usually in from 15 minutes to about 5 hours, the precipitated ammonium chloride is removed, such as by filtration, decantation, or centrifugation. If cyanamide is to be recovered, the reaction solvent is then separated by vacuum or atmospheric pressure distillation at a temperature below that at which the cyanamide will be dimerized to dicyandiamide, trimerized to melamine, or otherwise decomposed or polymerized.

The crude cyanamide solution that is recovered at the conclusion of the reaction contains principally cyanamide with only small amounts of polymers. At the higher reaction temperatures, a larger proportion of polymers are obtained. The cyanamide can be freed from such impurities by cautious distillation or by recrystallization from a solvent for cyanamide that is a nonsolvent for the higher polymers of cyanamide, such as a mixture of diethyl ether and benzene, or chloroform, or carbon disulfide. Indeed, a suitable choice of the solvent for the ammonolysis, such as tetrahydrofuran, will permit the cyanamide to be crystallized in substantially pure form from the concentrated, chilled reaction mixture.

The cyanamide solution can, if desired, be further reacted to form melamine. In such event, the solvent employed in the ammonolysis reaction can be used provided it is also non-reactive under the more severe trimerization conditions. In addition, the solvent should be a relatively poor solvent for melamine. The only classes of solvents meeting these stringent requirements are the polyoxyalkylene ethers and the cycloalkylene ethers mentioned above.

In carrying out the trimerization to melamine, the solvent containing cyanamide, after separation of the ammonium chloride, is pumped into an autoclave which is pressured with ammonia and brought to reaction temperature for trimerization to melamine.

The trimerization reaction is carried out at somewhat higher temperatures and therefore somewhat higher pressures than the ammonolysis. The temperature is at least 150° C. up to about 275° C., and preferably from 175° to 225° C. At too low a reaction temperature, below about 150° C., the formation of dicyandiamide is favored, despite the presence of ammonia. Temperatures above 275° C. can be used, provided the volatility of the solvent under these conditions is not so great that the pressures in the autoclave are excessive. Actually there is little reason to go above 275° C. or even 225° C., since nearly complete conversion to melamine is obtainable at this temperature or below, in reasonable reaction times of less than about one hour.

The time required for conversion of cyanamide to melamine in good yield will depend upon reaction temperature. The higher the temperature, the more rapid the conversion. In general, reaction times of from one-half hour to one hour are sufficient, although times of up to 10 hours can be used without disadvantage. However, there is certainly no point in continuing the reaction beyond the stage at which a satisfactory yield of melamine is obtained, inasmuch as any unreacted cyanamide or dicyandiamide in the reaction solution, after separation of melamine, can be reused for a further conversion.

The concentration of cyanamide in solution in the trimerization step is in no way critical, and will, of course, depend upon the amount of conversion obtained in the ammonolysis step. Usually, under the ammonolysis conditions set forth, conversions are obtained sufficient to produce a cyanamide concentration of from about 0.5 to about 25%.

The presence of ammonia is important in order to drive the reaction towards a more complete trimerization to melamine. In the absence of ammonia, the yield of dicyandiamide will be approximately equal to the yield of melamine, indicating that the dimerization and trimerization reactions proceed at approximately equal rates. Ammonia may increase the rate of trimerization, such that dicyandiamide is converted to melamine more or less as quickly as it is formed, and therefore is not present in a substantial amount in the reaction product.

The amount of ammonia required to obtain this beneficial result is rather small, and as littls as 0.1 mol of ammonia to each mol of cyanamide is sufficient, but preferably the amount of ammonia is at least 0.5 mol per mol of cyanamide. There is no upper limit on ammonia concentration, and as much as 10 mols of ammonia per mol of cyanamide can be used. Since the ammonia is not consumed in the course of the reaction and can be recovered for reuse, as much ammonia can be used as is desired, but obviously there is no advantage in using more ammonia than is necessary to obtain a quantitative conversion of cyanamide to melamine.

At the conclusion of the trimerization, the crude melamine is separated from the reaction mixture by centrifugation, filtration or decantation, and the residual liquor or filtrate is then returned to the ammonolysis step for reuse, if the amount of dissolved material is negligible. If the reaction mixture contains a substantial quantity of dicyandiamide, the solvent solution can be concentrated, the solvent recovered being returned to the ammonolysis step, and the residue, a concentrated cyanamide solution, is then returned to the autoclave for a further passage through the trimerization reaction. The ammonia recovered is returned to the ammonolysis solution.

The crude melamine can be used as such or, if further purification is desirable, can be recrystallized from water.

When desired, the cyanamide solution produced in the ammonolysis step of this invention can be reacted with an organic nitrile to form substituted guanamines. If the solvent employed in the ammonolysis step were an organic nitrile, the cyanamide solute and the nitrile solvent could be reacted to form the corresponding guanamine without the necessity of further nitrile addition.

The guanamine-forming reaction will take place with any non-homopolymerizable nitrile that is free from other groups reactive with cyanamide or ammonia, and that has one or a plurality of nitrile groups. A mononitrile gives rise to a monoguanamine, while a dinitrile can react at both nitrile groups to give a diaminotriazine compound. Thus, for example, dinitriles such as succinonitrile give diamino-s-triazinyl ethane:

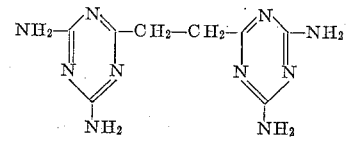

Those skilled in the art will perceive from the above that any of the following nitriles, to mention only a few, can be effectively employed in the process of the invention: acetonitrile, propiononitrile, 3-butenonitrile (allyl cyanide), butyronitrile, oleonitrile, isobutyronitrile, benzonitrile, cyclohexylnitrile, adiponitrile, glutaronitrile, succinonitrile, 1,4-dicyanocyclohexane, methoxyacetonitrile, ethoxybutyro-nitrile, and alpha-phenyl propionitrile.

The nitrile can either be added to the cyanamide solution derived from the ammonolysis reaction, or the solvent employed in the ammonolysis can be a nitrile meeting the solvent requirements in which case no additional nitrile need be added to form guanamine.

The guanamine reaction will proceed at an elevated temperature above about 90° C. and preferably above about 150° C. There is no critical upper limit on reaction temperature except that imposed by the stability of the reactants and the guanamine reaction product. However, reaction temperatures in excess of about 250° C. usually are not required, and temperatures between about 150° C. and 200° C. are preferred.

A sufficient pressure is imposed to maintain the reactants in the liquid phase. The pressure required will, of course, depend upon the reaction temperature and the volatility of the nitrile, and the amount of ammonia present. A sufficient pressure of ammonia is required in order to direct the reaction in favor of guanamine formation. In general, an amount of ammonia within the range from about 0.5 to about 10 mols per mol of cyanamide is adequate, and amounts of from 3.5 to 6.5 mols per mol of cyanamide are preferred. Accordingly, reaction pressures of from 100 to about 1000 p.s.i.g. usually are employed, although from 300 to 600 p.s.i.g. are adequate. Ammonia is not consumed in the reaction, and after completion of guanamine formation, the ammonia and the solvent, if any, together with unreacted nitrile can be recovered and recycled.

The reaction is conducted in a pressure vessel adequate to withstand the pressures required. After the formation of the cyanamide in accordance with this invention, excess nitrile can, if desired, be removed by distillation and reused. The cyanamide-nitrile solution or the cyanamide-solvent-nitrile mixture is added to the guanamine reactor and the mixture then pressured with the desired amount of ammonia and brought to reaction temperature. The reaction proceeds rapidly, and is ordinarily complete in about one to four hours, although frequently, particularly at elevated temperatures and high pressures, the reaction may be completed in about ten minutes.

The nitrile and cyanamide are reacted in at least approximately stoichiometric proportions, with an excess of nitrile generally maintained to retain the cyanamide in solution. Stoichiometrically, 0.5 mol of nitrile is required for each mol of cyanamide, but an amount of nitrile as high as 20 mols per mol of cyanamide can be used. Ratios of from about 1 to about 10 are usually preferred inasmuch as no more than 10 mols of nitrile is normally needed for solution of the amount of cyanamide employed.

The following example represents, in the opinion of the inventor, the best mode of carrying out the invention, using the apparatus of the figure.

*Example 1*

An aqueous saturated solution containing 260 grams of sodium chloride per liter was fed at a rate of about 125 liters per minute into a Hooker Type S chlorine-caustic cell of the type illustrated in the aforesaid article by Murray in Trans. A. I. Ch. E. 36 445–62 (1940) and the cell was operated at a current of 7000 amperes, a voltage drop of 3.5 volts and a temperature of 90° C. Chlorine gas was produced at the anode, and hydrogen gas at the cathode. Analysis of the solution in the cathode compartment indicated that 52% of the sodium chloride in the brine had been decomposed in the electrolysis reaction.

The chlorine gas evolved at the anode was continuously passed into the bottom of a chlorination tower at a rate of about 205 g./min. The tower was made of glass pipe packed with short lengths of glass tubing. A solution of hydrocyanic acid, containing 5% hydrogen cyanide and previously cooled to 14° C., was sprayed into the column at about 1/6 of its length from the top. The rate of flow of hydrocyanic acid solution was adjusted at 56 g./min. so as to maintain the temperature at the bottom of the column at about 50° C. The effluent cyanogen chloride vapor produced in the reaction was scrubbed with incoming brine, precooled to 15° C., fed in at a rate of 12 l./min., and thereafter through a calcium chloride desiccating column. The dried cyanogen chloride vapor was passed to the ammonolysis reactor.

The water from the washing tower which contained about 2% hydrogen cyanide was used in preparing hydrocyanic acid for the chlorinator. The hydrochloric acid brine solution produced during the chlorination was withdrawn from the chlorinator, and mixed with the caustic stream from the ammonia recovery unit. Care must be taken that the pH of brine solution is on the acid side, preferably below about 4. The efficiency decreases as the pH becomes more alkaline. The brine was recycled in part to the Hooker cell and in part to the cyanogen chloride unit.

The cyanogen chloride was dissolved in tetrahydrofuran and added to the ammonolysis reactor, sufficient tetrahydrofuran being employed to obtain a solution containing 20 grams of cyanogen halide per liter. The reactants were cooled to 0° C., and liquid ammonia was added to the reactor in an amount of two moles per mole of cyanogen chloride. After a reaction time of one hour, during which maintained below 30° C. by the addition of Dry Ice to the agitation was continued and the reaction temperature external cooling bath, the reaction mixture was filtered and the solid ammonium chloride obtained washed with additional tetrahydrofuran, which was then combined with the filtrate. The washed ammonium chloride was thereafter delivered to a recovery unit in which it was reacted with the sodium hydroxide from the Hooker cell, thereby yielding brine which was mixed with the chlorinator bottoms prior to recycling as described above, in part, and ammonia which was recycled to the ammonolysis reactor. The process employed in the recovery unit was the two step process described in U.S. Patent 2,519,451.

The filtrate from the ammonolysis reaction was determined to be a solution of cyanamide in tetrahydrofuran, the amount of cyanamide produced being calculated as 93% of the theoretical, based upon the amount of hydrogen cyanide consumed in the chlorination step.

The cyanamide solution produced by means of this example was concentrated to dryness at a temperature below 35° C., to give slightly oily, crude cyanamide. A pure product could be obtained in lower yield by concentrating the solution to about 75% by weight cyanamide, and chilling to induce crystallization, M.P. 40–42° C.

If instead of cyanamide, melamine were the desired end product, the filtrate from the ammonolysis reaction can be further reacted with ammonia to yield melamine, or with a nitrile to yield the corresponding substituted guanamine.

*Example 2*

An aqueous saturated brine solution was fed into a Hooker Type S chlorine-caustic cell at a rate of about 1.3 liters per minute, and the cell was operated at a current of 7000 amperes, a voltage drop of 3.5 volts and a temperature of 90° C. Chlorine gas was produced at the anode and hydrogen gas at the cathode. Analysis of the solution in the cathode compartment indicated that 52% of the sodium chloride in the brine had been decomposed in the electrolysis reaction.

The chlorine gas evolved at the anode was continuously passed to the bottom of a chlorination tower at a rate of about 200 g./min.

A 5% solution of hydrocyanic acid, cooled to 15° C., was sprayed into the column at the top at a rate of 50 g./min., so as to maintain the temperature at the bottom of the column at 55° C. The cyanogen chloride vapor produced in the reaction was scrubbed with incoming brine cooled to 15° C., fed in at 12 l./min., and thereafter through a calcium chloride dessicating column. The dried cyanogen chloride vapor was passed to the ammonolysis reactor.

The water from the washing tower which contained about 2% hydrogen cyanide was used in preparing hydrocyanic acid for the chlorinator. The hydrochloric acid brine solution produced during the chlorination was withdrawn from the chlorinator, and mixed with the caustic stream from the ammonia recovery unit. Care must be taken that the pH of brine solution is on the acid side, preferably below about 4. The efficiency decreases as the pH becomes more alkaline. The brine was recycled in part to the Hooker cell and in part to the cyanogen chloride unit.

The cyanogen chloride was dissolved in dioxan and added to the ammonolysis reactor, sufficient dioxan being employed to obtain a solution containing 20 grams of cyanogen halide per liter. The reactants were cooled to 0° C., and liquid ammonia was added to the reactor in an amount of two moles per mole of cyanogen chloride.

After a reaction time of one hour, during which agitation was continued and the reaction temperature maintained below 30° C. by the addition of Dry Ice to the external cooling bath, the reaction mixture was filtered and the solid ammonium chloride obtained washed with additional dioxan, which was then combined with the filtrate. The washed ammonium chloride was thereafter delivered to a recovery unit in which it was reacted with the sodium hydroxide from the Hooker cell, thereby yielding brine which was mixed with the chlorinator bottoms prior to recycling, and ammonia which was recycled to the ammonolysis reactor. The process employed in the recovery unit was the two step process described in U.S. Patent No. 2,519,451.

The cyanamide solution in dioxane was then transferred to an autoclave, the temperature raised to 192–195° C., and ammonia gas was added. The pressure of ammonia gas was allowed to reach 700 p.s.i.g. The temperature was maintained for about two hours and the pressure was thereafter released, venting the ammonia to the atmosphere, after which the mixture was cooled to room temperature. The solid product obtained from the reaction mixture was identified as melamine, and the yield of crude product obtained was calculated at 93% of the theoretical.

I claim:

1. A cyclic process for the production of cyanamide from hydrogen cyanide and ammonia, utilizing byproducts for production of more cyanamide, comprising electrolyzing an aqueous alkali metal chloride solution to form chlorine, with alkali metal hydroxide solution as a byproduct; separating the chlorine; reacting the chlorine with aqueous hydrogen cyanide solution, with cooling to maintain the temperature below 60° C., to form cyanogen chloride, with hydrogen chloride solution as byproduct; separating the cyanogen chloride; reacting the cyanogen chloride with ammonia, at a temperature at which the reaction proceeds within the range from about −40° C. to about 100° C. in solution in an inert solvent for cyanogen halide and cyanamide, in which cyanamide is soluble in an amount of at least 50 grams per liter and ammonium chloride is soluble in an amount not in excess of about 5 grams per liter, and selected from the group consisting of cyclic ethers having an ether oxygen in the ring and at least one ether oxygen for each five carbon atoms, polyoxyalkylene ethers having at least one ether oxygen for each five carbon atoms, sulfones having from four to twelve carbon atoms, esters of aliphatic fatty acids and aliphatic alcohols having from three to about ten carbon atoms, and aliphatic nitriles having from two to about ten carbon atoms, to form cyanamide, with ammonium chloride as a byproduct; and separating the cyanamide from the ammonium chloride; and recovering byproduct alkali metal hydroxide, ammonium chloride and hydrogen chloride by reacting ammonium chloride with alkali metal hydroxide solution to form ammonia and alkali metal chloride; separating the ammonia and reacting the ammonia with further cyanogen chloride to form cyanamide; and separating the alkali metal chloride solution and reacting hydrogen chloride solution with alkali metal hydroxide solution to form an alkali metal chloride solution, and electrolyzing the alkali metal chloride solutions to form chlorine.

2. A method in accordance with claim 1 including the steps of trimerizing the cyanamide in the said solution at a temperature at which trimerization proceeds within the range from about 150° C. up to about 275° C. at a pressure sufficient to maintain the reaction mixture in the liquid phase in the presence of sufficient ammonia to favor the trimerization and minimize production of dicyandiamide, and recovering melamine from the reaction mixture.

3. A method as in claim 1 wherein the electrolysis is performed in a caustic-chlorine compartmented cell.

4. A method as in claim 1 where the alkali metal chloride is sodium chloride.

5. A method as in claim 1 where the aqueous alkali metal chloride solution is a saturated brine.

References Cited by the Examiner

UNITED STATES PATENTS

| 1,588,731 | 6/1926 | Heuser | 23—14 |
| 2,170,491 | 8/1939 | Widmer et al. | 260—249.7 |
| 2,398,891 | 4/1946 | Julien et al. | 23—219 |
| 2,967,807 | 1/1961 | Osborne et al. | 204—128 XR |
| 3,177,215 | 4/1965 | Foreman et al. | 23—190 XR |
| 3,181,932 | 5/1965 | Foreman et al. | 23—190 |

OTHER REFERENCES

Jacobson: "Encyclopedia of Chemical Reactions," Reinhold Publishers Co., New York, vol. 6, 1956, pp. 320–323.

Williams: "Cyanogen Compounds," Edward Arnold and Co., London, 2d. ed., 1948, pp. 4 and 18.

BENJAMIN HENKIN, *Primary Examiner.*

MAURICE A. BRINDISI, *Examiner.*

E. C. THOMAS, *Assistant Examiner.*